United States Patent
Yabe et al.

(10) Patent No.: US 7,172,348 B2
(45) Date of Patent: Feb. 6, 2007

(54) OPTICAL SUB-ASSEMBLY HAVING AN ENHANCED DISCHARGE-RESISTANT ARRANGEMENT AND AN OPTICAL TRANSCEIVER USING THE SAME

(75) Inventors: Hiroyuki Yabe, Yokohama (JP); Satoshi Yoshikawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/108,898

(22) Filed: Apr. 19, 2005

(65) Prior Publication Data
US 2005/0244109 A1    Nov. 3, 2005

Related U.S. Application Data

(60) Provisional application No. 60/563,480, filed on Apr. 20, 2004.

(51) Int. Cl.
*G02B 6/36* (2006.01)
(52) U.S. Cl. .......................... 385/92; 385/93
(58) Field of Classification Search .............. 385/88, 385/92–94
See application file for complete search history.

(56) References Cited

U.S. PATENT DOCUMENTS

2005/0201695 A1*   9/2005   Farr ........................ 385/94

FOREIGN PATENT DOCUMENTS

EP    1 329 753 A1    7/2003

\* cited by examiner

*Primary Examiner*—Frank G. Font
*Assistant Examiner*—Michael P. Mooney
(74) *Attorney, Agent, or Firm*—Smith, Gambrell & Russell, LLP

(57) ABSTRACT

An optical assembly of the present invention comprises a package installing a semiconductor optical device therein, a metal sleeve attached to the package, and the resin holder disposed between package and the sleeve member. When this optical assembly is installed within the optical transceiver and even the metal sleeve extrudes into the optical receptacle and is exposed to the outside there, the EMI noise can be prevented from importing into the transceiver and radiating to the outside, because the resin holder made of substantially insulating material is disposed between the sleeve and the package.

17 Claims, 4 Drawing Sheets

OPTICAL SUB-ASSEMBLY HAVING AN ENHANCED DISCHARGE-RESISTANT ARRANGEMENT AND AN OPTICAL TRANSCEIVER USING THE SAME

CROSS REFERENCE TO RELATED APPLICATIONS

This application is based on, and claims priority from, U.S. Provisional Application 60/563,480 filed on Apr. 20, 2004.

BACKGROUND OF THE INVENTION

1. Field of the Invention

The present invention relates to an optical assembly that installs a light-emitting device or a light-receiving device therein, in particular, relates to a structure for enhancing the tolerance against the electro-static discharge.

2. Related Prior Art

The conventional structure of an optical assembly (hereinafter denoted as OSA) comprises a CAN-type package for installing a light-emitting or light-receiving device and an alignment member including a plurality of cylindrical members connected to the head portion of the CAN package. The CAN package, so called as a co-axial package, including a disk-shaped stem and a cap, both made of metal, mounts the light-emitting device such as laser diode onto the stem so as to coincide the optical axis of the laser diode with the center axis of the cylindrical members. The head portion of the cap provides a lens for concentrating the light emitted from the laser diode.

For such CAN-type package with the laser diode, the cylindrical members align and optically couple the laser diode with the distal end of an optical fiber. That is, the plurality of cylindrical members aligns the optical axis of the laser diode in the XY plane, which intersecting the optical axis, and along the Z-direction parallel to the optical axis. Here, the optical axis means a virtual line connecting the laser diode with the distal end of the optical fiber. After the alignment, the cylindrical members are welded not only to each other but also to the CAN package in order to secure the optical coupling permanently. An optical transceiver completes to install such OSAs therein and to connect these OSAs to the electronic circuit provided on a circuit board.

In the conventional OSA, fixing of the cylindrical members to each other or to the CAN package used to be carried out with the YAG laser welding. In the YAG laser welding, optical beams output from the YAG laser with extreme power are irradiated in short time to points to be welded to melt there locally. In order to melt locally with the optical beam, the members to be welded are limited to materials with low thermal conductivity in addition to the mechanical stiffness. Therefore, metals such as iron (Fe), stainless steel, and Kovar™, are applied the cylindrical member.

On the other hand, the OSA is installed within the transceiver as the cylindrical member thereof protrudes into the optical receptacle of the transceiver. Here, the optical receptacle is formed in the front side of the optical transceiver and receives an optical connector to couple the optical fiber secured in the optical connector with the laser diode in the CAN package. In this arrangement, since the cylindrical member made of metal is exposed outside of the transceiver, the cylindrical member may operate as an antenna to import noise from the outside or to export the noise to the outside as an electromagnetic interference (EMI). Moreover, the optical connector with the static charge mates with the OSA in the receptacle, this static charge is conveyed to the circuit board installed in the transceiver via the metal OSA, which may break the circuit element mounted thereon.

To make the OSA with resin, in particular, a portion of the cylindrical member thereof, will solve at least above subject. However, the resin sleeve tends to be affected by the abrasion due to the ferrule inserting there into or extracting therefrom. Moreover, since the resin sleeve is inferior in holding the ferrule therein to the metal sleeve, the resin sleeve is unsuitable to the single mode fiber having a relatively small core.

SUMMARY OF THE INVENTION

Therefore, an object of the present invention is to solve subjects above described. A feature of the invention is that a part of the cylindrical members is made of insulating material or made of material having a reasonable conductivity, namely, the electrical conductivity able to convey the static discharge within a range not breaking the circuit element.

An optical assembly, according to the present invention, has a feature to comprise a semiconductor optical device, a package for enclosing the semiconductor optical device, a sleeve member attached to the package, and a resin holder disposed between the sleeve member and the package. The resin holder may be insulating.

By providing this resin holder, even when the metal sleeve member is exposed to the outside of the transceiver, the EMI noise imported into the transceiver via the sleeve member or that radiating to the outside of the transceiver can be suppressed.

In the present optical assembly, it is preferable to provide a metal holder between the sleeve member and the resin holder. This metal holder enables to weld the sleeve member with the YAG laser.

Further, the resin holder is preferable to have a disc shaped portion and a cylindrical portion extending from the disc shaped portion. The cylindrical portion may cover the side of the cap of the package. Accordingly, the resin holder enables to align the sleeve member in optical with the semiconductor optical device within the package by sliding the cylindrical portion of the resin holder on the side of the cap. Further, to move the sleeve member on the metal holder enables to align the sleeve member along two directions intersecting the optical axis.

Moreover, the metal holder may also provide a disc shaped portion and a cylindrical portion extending from the disc shaped portion. The cylindrical portion covers the side of the cylindrical portion of the resin holder. To increase the contact area between the resin holder and the metal holder enhances the adhesive strength therebetween. Still further, the resin holder may provide a protruding portion on a center thereof in a surface facing the metal holder, and the metal holder may provide a hollow, corresponding to the protruding portion of the resin holder, in a surface facing the resin holder. The protruding portion of the resin holder may be press-fitted into the hollow in the metal holder, which also enhances the connection strength therebetween.

The resin holder may provide a hollow in a center of a surface facing the package to receive the lens mounted in the package. In this arrangement, without increasing the thickness of the resin holder, a series of members of the cap, the resin holder, the metal holder, and the sleeve member are assembled in compact.

Another aspect of the present invention relates to an optical transceiver, which comprises the optical assembly above mentioned, a substrate for installing an electronic circuit, a housing for enclosing these optical assembly and the substrate, a holder for fixing the assembly to the housing, and a cover for covering these assembly, the substrate and the holder. The housing, made of resin, includes first to third portions. The first portion includes an optical receptacle for receiving the optical connector. The second portion provides a structure for installing the optical assembly, and the third portion provides a structure for installing the substrate.

The second portion of the housing, as mentioned above, installs the optical assembly. In the same time, the metal sleeve member protrudes into the optical receptacle in the first portion. Only the metal sleeve member is exposed outside to the transceiver among metal members used therein. However, the resin holder provided between the metal sleeve member and the package prevents the EMI noise from importing into the transceiver, and radiating to the outside of the transceiver.

DETAILED DESCRIPTION OF PREFERRED EMBODIMENTS

Next, preferred embodiments of the present invention will be described. In drawings and their explanations, same elements will be referred by same numerals or symbols without overlapping explanations.

First Embodiment

Figure 1A:
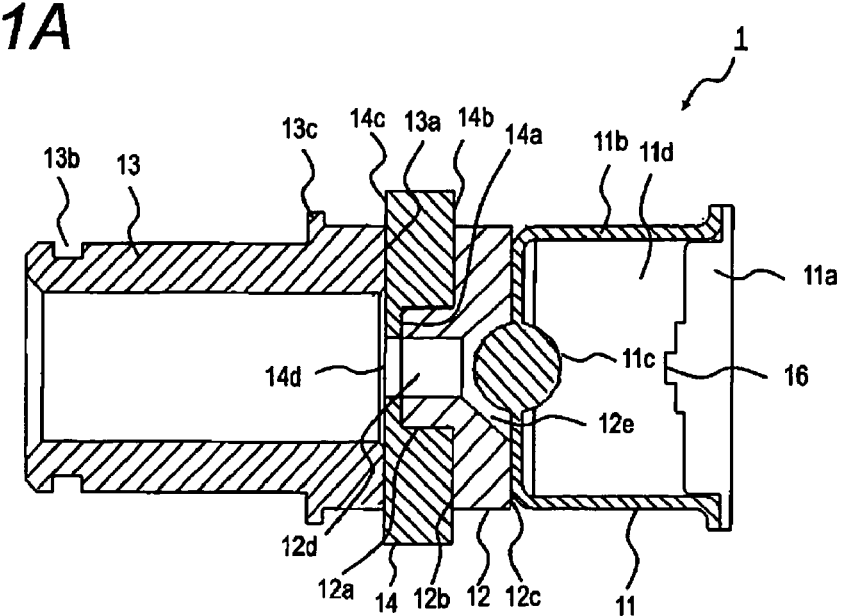
FIG. 1A illustrates a cross section of the optical assembly according to the first embodiment of the invention.
Figure 1B:
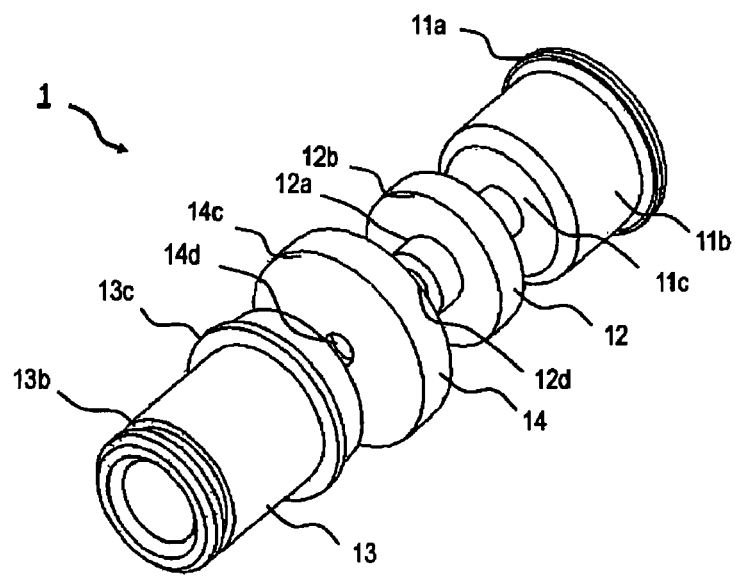
FIG. 1B illustrates an exploded view of the optical assembly.

FIG. 1A is a side section of an optical assembly 1 according to the first embodiment of the present invention, and FIG. 1B illustrates an exploded view of the optical assembly.

The optical assembly 1 comprises a CAN type package 11, a sleeve member 13, a resin holder 12 and a metal holder 14. These two holders, 12 and 14, are sandwiched between the CAN package 11 and the sleeve member 13. The sleeve member 13 and two holders 12 and 14 constitute an optical coupling portion 15. The CAN package 11, including a stem 11a and a cap 11b, installs a semiconductor optical device 16 on the stem 11a. The semiconductor optical device 16 may be a semiconductor laser diode (LD) or a semiconductor light-emitting diode (LED) in the case that the optical assembly 1 is a transmitting optical subassembly (TOSA), while the device 16 may be a photodiode (PD) in the case that the optical assembly 1 is a receiving optical subassembly (ROSA).

Although not shown in figures, a plurality of lead pins is extracted from the stem 11a to supply electrical signals and electric power to the semiconductor optical device 16. Between these lead pins and the stem 11a are filled with an insulating material such as seal glass to isolate between the lead pins and the stem 11a electrically, and in the same time, a cavity 11d, into which the semiconductor optical device 16 is installed, is air-tightly sealed.

The stem 11a and the cap 11b are made of metal such as iron (Fe) and Kovar™. The projection welding may fix the cap 11b to the brim portion of the stem 11a. In an alternation, the adhesive may fix the cap 11b to the stem 11a.

As illustrated in FIG. 1A, a lens for concentrating light is mounted on a center portion of the ceiling in the cap 11b, but the lens 11e may be omitted, not always provided in the cap. The lens 11e is fixed to the cap 11b with a seal glass to seal the cavity 11d air-tightly. Without the lens 11e, a window made of transparent material to wavelengths of the light concerned is preferable to seal the cavity 11d.

The resin holder 12 is a disk-shaped member made of resin and positioned in the front portion of the CAN package. Typical material for the resin holder is poly-phenylene sulfide (PPS). The connection between the resin holder and the CAN package is carried out with adhesive. Both of the ultraviolet curable adhesive and the heat curable adhesive may be used for the connection. The adhesive applied on the surface 12c of the resin holder 12 that faces the CAN package 11 and a region surrounding the lens 11c on the ceiling of the cap 11b fixes the resin holder 12 and the CAN package 11. On a center of the resin holder 12 facing the CAN package 11 is provided with a hollow 12a that receives the lens 11e. In FIG. 1A, the hollow 12a has an inclined side surface. However, the shape of the hollow 12e is not restricted to such sloped surface. The hollow 12e may have the side surface substantially parallel to the optical axis.

The resin holder 12 may be formed by the insertion mold, in which the resin and the metal are integrally molded. That is, the metal holder 14 is set, in advance, into the molding die into which the resin is injected to form a resin product, and, by cooling the resin within the molding die, the metal holder 14 and the resin holder 12 are formed integrally.

The metal holder 14 is sandwiched between the resin holder 12 and the metal sleeve member 13. The metal holder 14 is made of, for instance, stainless steel and has a disk shape. A hollow 14a is formed in the center portion at the surface facing the resin holder 12 to receive the protruding portion 12a formed in the center of the resin holder 12. The protruding portion 12a of the resin holder 12 is press-fitted into the hollow 14a in the metal holder 14. The bond strength between these two holders 12, 14 may be enhanced, in addition to this press fitting, by providing the adhesive therebetween.

FIG. 1A illustrates that the diameter of the resin holder 12 and that of the metal holder 14 are different to each other. However, these two diameters may be made equal to each other. Moreover, when two diameters are different, i.e. when the diameter of the metal holder 14 is greater than that of the resin holder 12, the metal holder 14 may be used as a flange usable to fix this assembly 1 against the equipment such as the optical transceiver.

The sleeve member 13, provided in the front side of the CAN package 11 and made of metal, has a cylindrical shape. By receiving the ferrule, which is not shown in FIG. 1A and is secured in the distal end of the optical fiber, into the bore of the cylinder, the sleeve member 13 makes the optical fiber positioned in the center of the ferrule to couple with the semiconductor optical device 16 installed within the CAN package 11. The sleeve member 13 is typically made of stainless steel in the case of the metal sleeve. When the optical fiber inserted there into is a single mode fiber, the optical coupling between such optical fiber and the semiconductor optical device 16 requires the accuracy of a few microns meter or less. While, after the optical coupling between the optical fiber and the optical device 16 is once established, and the sleeve member 13 and the metal holder 14 are so positioned, the optical coupling condition should not be affected by the ferrule inserting into or extracting from the sleeve member 13. Thus, the sleeve member 13 requires the stiffness in addition to the dimensional accuracy, so the stainless steel is optimum material for the sleeve member 13.

The other surface 14c of the metal holder 14, namely the surface facing the sleeve member 13, is processed in flat to enable the optical alignment between the optical fiber secured in the ferrule and the semiconductor optical device 16 by sliding the sleeve member 13 on this surface 14c. On the center portion of the metal holder 14 is provided with an opening 14d to pass the light so as to extend the opening 12d provided in the resin holder 12. The diameter of this opening 14d is smaller than the inner diameter of the sleeve member 13 to make the ferrule inserted into the sleeve member 13 butt to this surface 14c of the metal holder 14, thus, positioning the ferrule along the optical axis, Z-direction, in the sleeve member 13.

The alignment within the plane, namely the XY-plane that is perpendicular to the optical axis, is carried out by sliding the sleeve member 13 on the surface 14c of the metal holder 14. Specifically, for the case of the TOSA, under the condition that the ferrule with the optical fiber is inserted into the sleeve member 13, the light-emitting device 16 such as semiconductor laser diode mounted on the stem 11a is practically operated, and the magnitude of the optical output power from the optical fiber is monitored, the sleeve member 13 is fixed at the position where the monitored magnitude becomes a predefined value. In the case of the ROSA, under the condition that the signal light is guided into the optical fiber, which is inserted into the sleeve member 13, and the optical power is monitored by the semiconductor optical device 16 mounted in the assembly 1, the sleeve member 13 is aligned at the position where the magnitude monitored by the optical device 16 becomes the maximum.

The connection between the sleeve member 13 and the metal holder 14 may be done by the YAG laser welding. That is, the end 13a of the sleeve member 13 provides a flange and this flange is welded, by the YAG laser, to the metal holder 14. Occasionally, the sleeve member 13 without any flange in the end 13a thereof may be welded to the metal holder 14. Since the YAG laser may weld both materials in quite short time by optical pulses with extreme power, the optical misalignment occurred during the solidification of materials may be prevented.

On the outer surface of the sleeve member 13 is provided with some flanges 13c to position this assembly 1 in the optical transceiver. The sleeve member 13 further provides a groove 13b in the front portion thereof to be utilized in the mating with the optical connector.

Thus, according to the present configuration of the optical assembly 1, since the resin holder 12, made of substantially insulating material, is disposed between the CAN package 11 and the metal sleeve member 13, it is prevented to convey the static electricity from the charged optical connector to the CAN package 11 or to the electronic circuit board, even when this optical assembly 1 is installed in the optical transceiver and the static electricity is conveyed to the metal sleeve member 13 positioned in the optical receptacle. Another material may be applicable for the resin holder 12, in which such material has a moderate electrical conductivity only to convey the static electricity not breaking the circuit element.

Second Embodiment

Figure 2A:
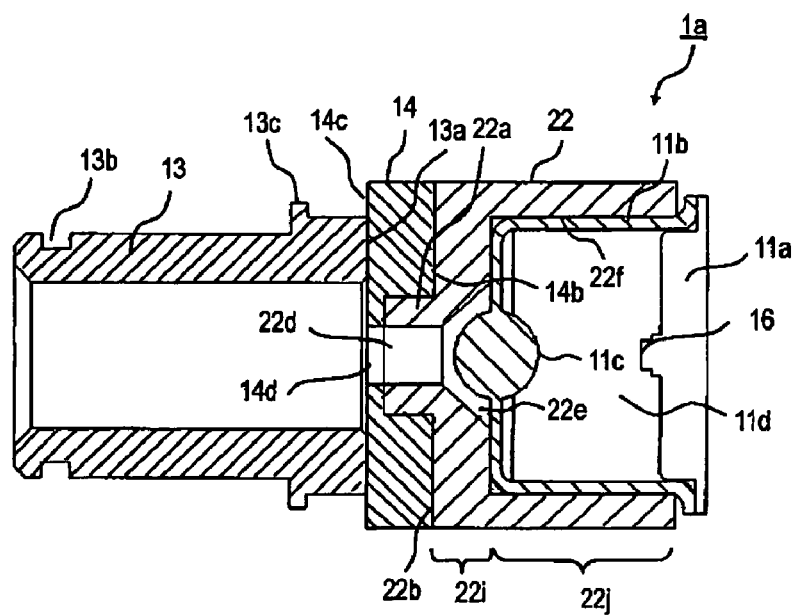
FIG. 2A illustrates a cross section of the optical assembly according to the second embodiment of the invention.
Figure 2B:
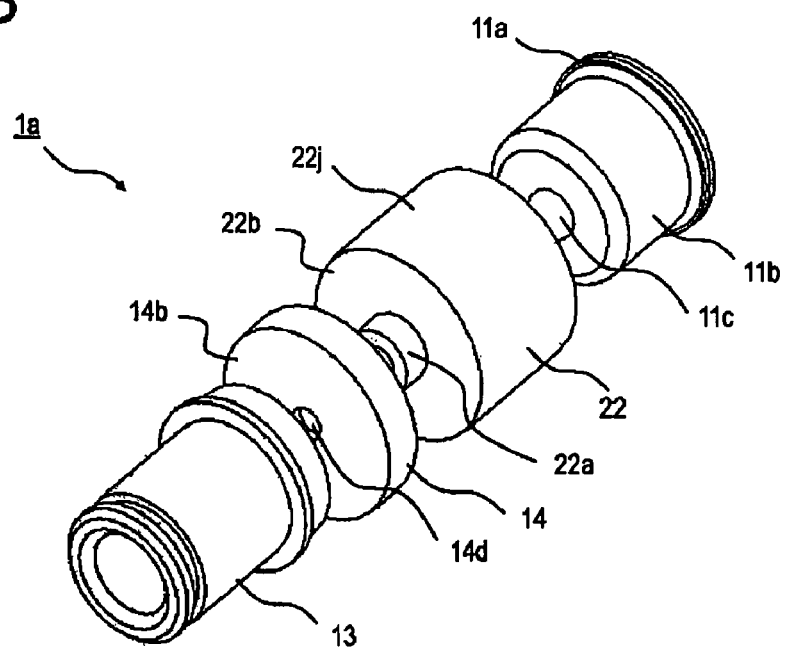
FIG. 2B illustrates an exploded view of the optical assembly.

FIG. 24 shows the second embodiment of the present invention, and FIG. 2B is an exploded view of the second embodiment. In the present embodiment, the resin holder 22 and the metal holder 14 are provided between the CAN package 11 and the sleeve member 13. The shape of the resin holder 22 is different to that 12 shown in the first embodiment.

The resin holder 22 comprises a first portion 22i having a disk shape and a second portion 22j extending from the first portion 22i as keeping the diameter thereof coincide with that of the first portion 22i. The shape of the first portion 22i is similar to that shown in the previous embodiment including the arrangement to mate with the metal holder 14. The resin holder 22 is fixed to the metal holder 14 by the press-fitting, by the press-fitting with the adhesive, or by the insertion molding with the metal holder 14. The press-fitting is performed such that, the diameter of the protruding portion 22a is set to be slightly greater than the diameter of the hollow 14a provided in the center of the metal holder 14, the protruding portion 22a is press-fitted into the hollow 14a.

The second portion 22j of the resin holder 22, extending from the first portion 22i, covers the side surface of the cap 11b. The connection between the cap 11b and the second portion 22j of the resin holder 22 is done by the adhesive. In the present embodiment, the inner surface 22f of the second portion 22j and the side surface of the cap 11b provide the adhesive. Both adhesives of the ultraviolet violet curable type and the heat curable type may be applicable. Since the ceiling of the cap 11b does not provide the adhesive, it may be escaped that the excess adhesive extends on the ceiling to the lens 11c and makes the lens 11c dirty. When the ultraviolet curing adhesive is used, the inner surface 22f of the second portion 22j is preferable to be metallized to enable the ultraviolet rays to reach the depths of the second portion 22j, which enhances the efficiency of the curing.

One feature of the present assembly 1a is that, by sliding the CAN package 11 within the bore of the second portion 22j, the optical alignment along the optical axis may be carried out between the optical fiber and the semiconductor optical device 16 in the CAN package 11. On the other hand, the alignment along two directions intersecting the optical axis, similar to the aforementioned embodiment, may be done by sliding the sleeve member 13 on the surface 14c of the metal holder 14. The YAG laser welding, as described in the previous embodiment, may fix the sleeve member 13 and metal holder 14 after the alignment.

Third Embodiment

Figure 3A:
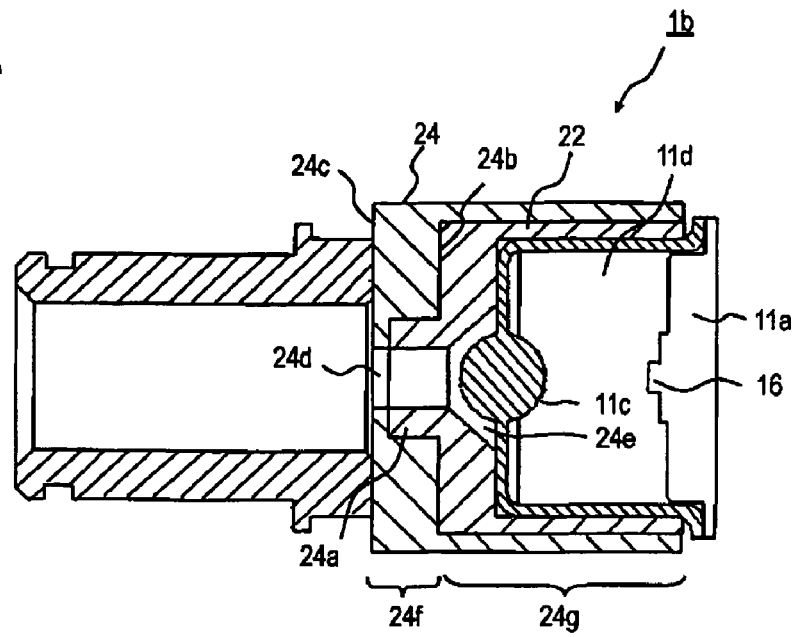
FIG. 3A illustrates a cross section of the optical assembly according to the third embodiment of the invention.
Figure 3B:
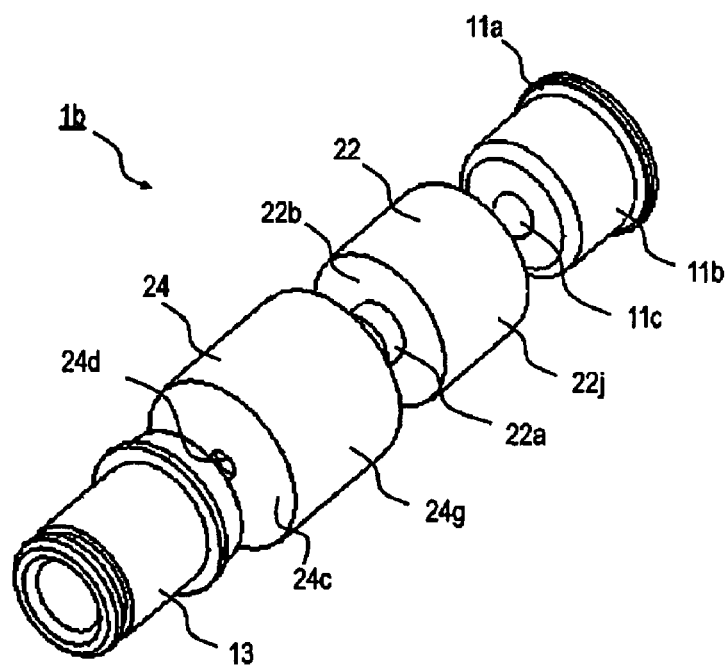
FIG. 3B illustrates an exploded view of the optical assembly.

FIG. 3A is a cross section, and FIG. 3B is an exploded view of the third embodiment according to the invention. In this embodiment, in addition to the second embodiment, the metal holder 24 has a particular shape.

The metal holder 24 in this assembly 1b comprises a disk-shaped first portion 24f and a cylindrical second portion 24g. The first portion 24g has a similar shape to the metal holder 14 in the first and second embodiments. While, the second portion 24g, extending from the first portion 24g, fully covers the second portion 22J of the resin holder 22 as keeping the diameter thereof constant.

The resin holder 22 is fixed to the metal holder 24 by the press-fitting, by the press-fitting together with the adhesive, or is formed by the insertion mold with the metal holder 24. The connection between the metal holder 24 and the sleeve member 13, similar to the first and second embodiments, is done by the YAG laser welding, while the connection between the resin holder 22 and the CAN package 11 is done by the adhesive curable with the ultraviolet rays provided between the inner surface 22f of the second portion 22j and the outer side surface of the cap 11b.

In these second and third embodiments, the bond strength between the resin holder 22 and the cap 11b can be enhanced compared with that of the first embodiment, because the area to be connected is widened in these embodiments. Moreover, the optical alignment along the Z-direction may be carried out, therefore, the optical coupling with high efficiency can be obtained.

Fourth Embodiment

Figure 4:
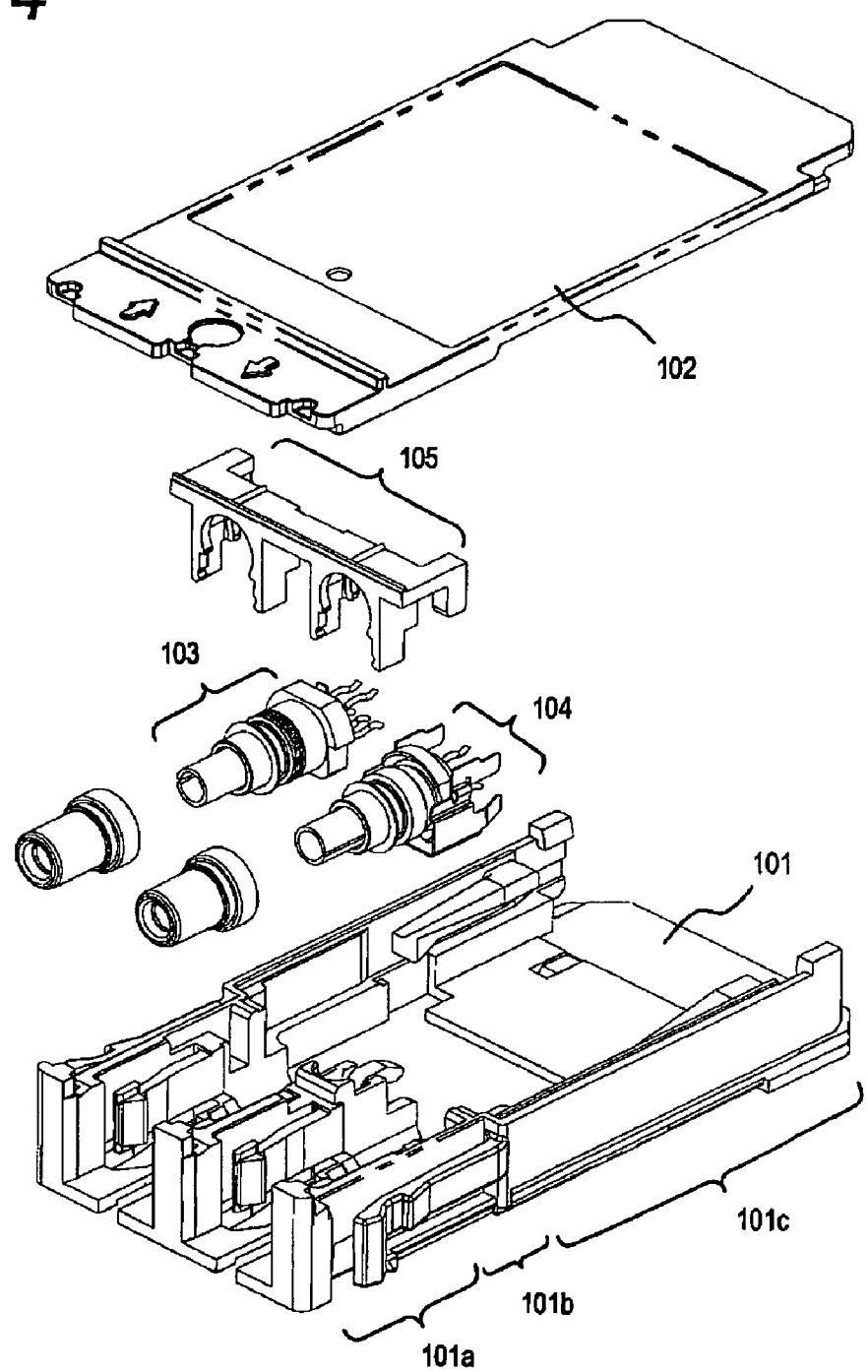
FIG. 4 illustrates an exploded view of the optical transceiver installing the optical assemblies of the invention.

FIG. 4 is an exploded view showing an optical transceiver 100 that installs the optical assemblies, TOSA and ROSA, according to the present invention.

The optical transceiver 100 comprises a base 101, a cover 102, the ROSA 103, the TOSA 104, and an assembly holder 105. Within a space defined by the base 101 and the cover 102, which is formed behind the ROSA 103 and the TOSA 104, is provided with a circuit board installing an electronic circuit, not shown in FIG. 4. This electronic circuit includes a driver for processing the signal input from the outside of the transceiver 100 and driving the light-emitting device within the TOSA 104 by thus processed signal, and a signal processor for amplifying a signal converted by the light-receiving device within the ROSA 103 and outputting thus amplified signal to the outside of the transceiver 100.

The base includes an optical receptacle portion 110a, an assembly installing portion 101b and a substrate installing portion 101a in this order. The optical receptacle portion 101a provides two opening, for the optical transmitting and the optical receiving, respectively, in the front side thereof, into which the optical connector is inserted. The shape of the openings and the pitch therebetween are defined by the standard of the optical connector.

The assembly installing portion 101b mounts the ROSA 103 and the TOSA 104. That is, the assembly installing portion 101b mounts the ROSA/TOSA, 103 and 104, by the structures provided in the assembly installing portion 101b with the assembly holder 105 so as to sandwich the flanges provided in the ROSA/TOSA. At the position thus fixed, the distal end of the sleeve member protrudes within the optical receptacle portion 101a. Accordingly, the semiconductor optical device installed within the ROSA/TOSA, 103 and 104, can optically couple with the optical fiber secured in the optical plug inserted into the optical receptacle portion 101a.

In the transceiver 100, the distal ends of the ROSA/TOSA, 103 and 104, are respectively covered with an assembly cover. Although the sleeve member is required to couple with the optical fiber, when the sleeve member is exposed within the optical receptacle portion 101a, the once decided position easily varies from the optimum position by force applied from the outside of the transceiver 100. Therefore, the assembly cover may prevent this positional deviation of the sleeve member 13.

The base 101, the Assembly holder 104, and the assembly cover may be generally made of resin. On the other hand, the ROSA/TOSA, 103 and 104, are made of metal, as mentioned in the description for previous embodiments, from various view points such as the optical coupling accuracy, the robustness of the coupling state and the cost merit. Therefore, only the sleeve member, among the metal members, is exposed to the outside of the transceiver. Accordingly, this metal sleeve member operates as an antenna for the EMI noise to radiate to the outside or to import from the outside. For such EMI noise, by inserting the resin member between the metal sleeve and the metal package, this antenna effect can be prevented.

Thus, the invention has been described. Although the explanation above is referred mainly to the TOSA, the configuration of the OSA according to the present invention can be easily applied to the ROSA.

What is claimed is:

1. The optical assembly comprising:
   a semiconductor optical device;
   a package for installing said semiconductor optical device;
   a metal sleeve member coupled to said package;
   a resin holder disposed between said package and said metal sleeve member, said resin holder being substantially insulating; and
   a metal holder disposed between said metal sleeve member and said resin holder.

2. The optical assembly according to claim 1, wherein said package is a co-axial type package including a disk-shaped stem for mounting said semiconductor optical device and a cap extending from said disk-shaped stem, and said resin holder includes a disk-shaped first portion and a cylindrical-shaped second portion extending from said first portion, said second portion covering a side of said cap of said package.

3. The optical assembly according to claim 2, wherein said metal holder includes a disk-shaped portion and a cylindrical portion extending from said disk-shaped portion of said metal holder, said cylindrical portion covering said second portion of said resin holder without being in contact with said stem of said package.

4. The optical assembly according to claim 2,
   wherein said cap provides a lens arranged on an optical axis of said semiconductor optical device, and
   wherein said resin holder provides a hollow for receiving said lens in a surface facing said cap.

5. The optical assembly according to claim 1, wherein said resin holder provides a protrusion in a surface facing said metal holder, and said metal holder provides a hollow to receive said protrusion in a surface facing said resin holder.

6. The optical assembly according to claim 5, wherein said protrusion in said resin holder is press-fitted into said hollow of said metal holder.

7. The optical assembly according to claim 1, wherein said metal holder provides a diameter greater than a diameter of said resin holder.

8. The optical assembly according to claim 1,
   wherein said package provides a lens on an optical axis of said semiconductor optical device, and
   wherein said resin holder provides a hollow to receive said lens in a surface facing said package.

9. An optical transceiver configured for an optical signal to transmit to and to receive from an optical fiber by mating with an optical connector having said optical fiber, said optical transceiver comprising:
   an optical assembly including
   a semiconductor optical device,
   a package for installing said semiconductor optical device, a metal sleeve member coupled to said package, and
an insulating resin holder disposed between said package and said metal sleeve member,
a substrate for electrically coupling to said optical assembly;
an assembly holder for fixing said optical assembly;
a body including first to third portions, said first portion providing an optical receptacle for receiving said optical connector, said second portion fixing said optical assembly co-operated with said assembly holder, and said third portion installing said substrate; and
a cover for covering said optical assembly, said substrate and said assembly holder,
wherein said metal sleeve member of said optical assembly protrudes into said optical receptacle to mate with said optical connector for coupling said semiconductor optical device installed in said optical assembly with said optical fiber secured in said optical connector.

10. The optical transceiver according to claim 9, further comprises a metal holder disposed between said metal sleeve member and said resin holder.

11. The optical transceiver according to claim 10, wherein said package is a co-axial type package including a disk-shaped stem for mounting said semiconductor optical device and a cap extending from said disk-shaped stem, and
wherein said resin holder includes a disk-shaped first portion and a cylindrical-shaped second portion extending from said first portion, said second portion covering a side of said cap of said package.

12. The optical transceiver according to claim 11, wherein said metal holder includes a disk-shaped portion and a cylindrical portion extending from said disk-shaped portion of said metal holder, said cylindrical portion covering said second portion of said resin holder without being in contact with said stem of said package.

13. The optical assembly transceiver according to claim 10,
wherein said cap provides a lens on an optical axis of said semiconductor optical device, and
wherein said resin holder provides a hollow for receiving said lens in a surface facing said cap.

14. The optical transceiver according to claim 10,
wherein said resin holder provides a protrusion in a surface facing said metal holder, and said metal holder provides a hollow to receive said protrusion in a surface facing said resin holder.

15. The optical transceiver according to claim 14, wherein said protrusion in said resin holder is press-fitted into said hollow of said metal holder.

16. The optical transceiver according to claim 10, wherein said metal holder provides a diameter greater than a diameter of said resin holder.

17. The optical transceiver according to claim 9,
wherein said package provides a lens arranged on an optical axis of said semiconductor optical device, and
wherein said resin holder provides a hollow to receive said lens in a surface facing said package.

* * * * *